July 31, 1962 D. R. HEARSUM ET AL 3,047,226

DATA ANALYZING AND RECORDING MEANS

Original Filed April 16, 1953 10 Sheets-Sheet 1

INVENTORS
DESMOND R. HEARSUM
ERNEST V. GULDEN

BY Louis A. Kline
Albert L. Sessler, Jr.

THEIR ATTORNEYS

July 31, 1962 D. R. HEARSUM ET AL 3,047,226

DATA ANALYZING AND RECORDING MEANS

Original Filed April 16, 1953 10 Sheets-Sheet 2

INVENTORS
DESMOND R. HEARSUM
ERNEST V. GULDEN

BY Louis A. Kline
Albert L. Sessler, Jr.
THEIR ATTORNEYS

DATA ANALYZING AND RECORDING MEANS

INVENTORS
DESMOND R. HEARSUM
ERNEST V. GULDEN
BY Louis A Kline
Albert L. Sessler, Jr.
THEIR ATTORNEYS July 31, 1962 D. R. HEARSUM ET AL 3,047,226

DATA ANALYZING AND RECORDING MEANS

Original Filed April 16, 1953 10 Sheets-Sheet 4

INVENTORS
DESMOND R. HEARSUM
ERNEST V. GULDEN

BY Louis A. Kline
Albert L. Sessler, Jr.
THEIR ATTORNEYS

DATA ANALYZING AND RECORDING MEANS

Original Filed April 16, 1953

INVENTORS
DESMOND R. HEARSUM
ERNEST V. GULDEN
BY Louis A. Kline
Albert L. Sessler, Jr.
THEIR ATTORNEYS

DATA ANALYZING AND RECORDING MEANS

Original Filed April 16, 1953 10 Sheets-Sheet 6

INVENTORS
DESMOND R. HEARSUM
ERNEST V. GULDEN
BY Louis A. Kline
Albert L. Sessler, Jr.
THEIR ATTORNEYS July 31, 1962 D. R. HEARSUM ET AL 3,047,226

DATA ANALYZING AND RECORDING MEANS

Original Filed April 16, 1953 10 Sheets-Sheet 7

INVENTORS
DESMOND R. HEARSUM
ERNEST V. GULDEN

BY Louis A Kline
Albert L. Sessler, Jr.
THEIR ATTORNEYS

DATA ANALYZING AND RECORDING MEANS

Original Filed April 16, 1953 10 Sheets-Sheet 8

INVENTORS
DESMOND R. HEARSUM
ERNEST V. GULDEN
BY Louis A. Kline
Albert L. Sessler, Jr.
THEIR ATTORNEYS

DATA ANALYZING AND RECORDING MEANS

Original Filed April 16, 1953 10 Sheets-Sheet 9

INVENTORS
DESMOND R. HEARSUM
ERNEST V. GULDEN
BY Louis A Kline
Albert L. Sessler, Jr.
THEIR ATTORNEYS

DATA ANALYZING AND RECORDING MEANS

Original Filed April 16, 1953 10 Sheets-Sheet 10

INVENTORS
DESMOND R. HEARSUM
ERNEST V. GULDEN
BY Louis A. Kline
Albert L. Sessler, Jr.
THEIR ATTORNEYS United States Patent Office 3,047,226
Patented July 31, 1962

3,047,226

DATA ANALYZING AND RECORDING MEANS

Desmond R. Hearsum, Dayton, and Ernest V. Gulden, Centerville, Ohio, assignors to The National Cash Register Company, Dayton, Ohio, a corporation of Maryland Original application Apr. 16, 1953, Ser. No. 349,297, now Patent No. 2,943,788, dated July 5, 1960. Divided and this application Mar. 25, 1960, Ser. No. 17,682
11 Claims. (Cl. 235—151)

This invention relates to a machine for analyzing classified data recorded on a tape, and for producing a summary record of some or all of the data on the tape, as desired, and in particular relates to a machine for performing such analyses at high speeds. This is a division of United States patent application Serial No. 349,297, filed April 16, 1953, now United States Patent No. 2,943,788, issued July 5, 1960.

As described in the above-cited parent application, the novel machine is capable of feeding or passing a tape back and forth past a sensing means at high speeds, and is capable of sensing the data on the tape while the tape moves in either direction, thereby eliminating idle rewind operations of the tape between sensing operations.

The sensing means senses the tape for classification or code numbers and related amounts, and is capable of sensing the code number just prior to the sensing of the related amount. A control member in the sensing means is adjustable, according to the direction of the tape feed, to enable the code numbers to be sensed just before their related amounts when the tape is being fed or passed in either direction past the sensing means.

Selecting means in the machine compare sensed code numbers for the various entries on the tape against a selected code number set up in the machine, and cause all amounts related to the selected code number to be selected and accumulated in a single pass of the tape, the selecting means and the accumulating means being capable of operating at sufficiently high speeds that they can perform their functions while the tape is in continuous motion during a pass in either direction of travel.

The machine is so arranged that it can be controlled to select data related to a single classification or code number in a single pass of the tape, or can be controlled to make a plurality of passes to select data related to each of the code numbers between a starting code number and a stopping code number, which can be preset in the machine. When the selection of data is to be made according to a group of numbers, the selecting means in the machine is initially set to the lowest number of the group, and, at the end of each pass, "one" is added to the code number until the highest number of the group is reached.

A counter is provided to count the number of entries which have been made in the accumulator during a pass of the tape.

At the end of any pass in which data is entered in the accumulator, a summary recorder unit of the machine will be set according to the classification or code number of the pass, and according to the amounts in the accumulator and the counter. The next pass is begun as soon as the summary recorder has been set, and the actual recording takes place during the next pass. Since the actual recording of the summary data is a slow operation as compared with the other operations performed by the machine, the overlapping of the recording of summary data for one pass with the analysis in the next pass speeds up the overall operation in making the analysis and the summary record.

It is an object of the invention to provide a tape-analyzing machine for performing analyses at high speeds and for producing summary records of the result of such analyses.

A further object of the invention is to provide novel controls for a summary recorder unit of a tape-analyzing machine, whereby the summary recorder is set, according to data accumulated during a pass of the tape, while the direction of the tape is being reversed, and the recording of the summary data takes place during the next pass of the tape, while a further analysis is being made.

With these and incidental objects in view, the invention includes certain novel features of construction and combinations of parts, a preferred form or embodiment of which is hereinafter described with reference to the drawings which accompany and form a part of this specification.

Of said drawings:

FIGS. 1A and 1B together are a top plan view of the summary recorder unit of the machine, with its cabinet omitted and certain parts broken away to show the construction of the indicating and printing mechanism more clearly.

FIGS. 5A to 5E inclusive, together, show the circuit diagram of the analyzing machine.

Figure 6:
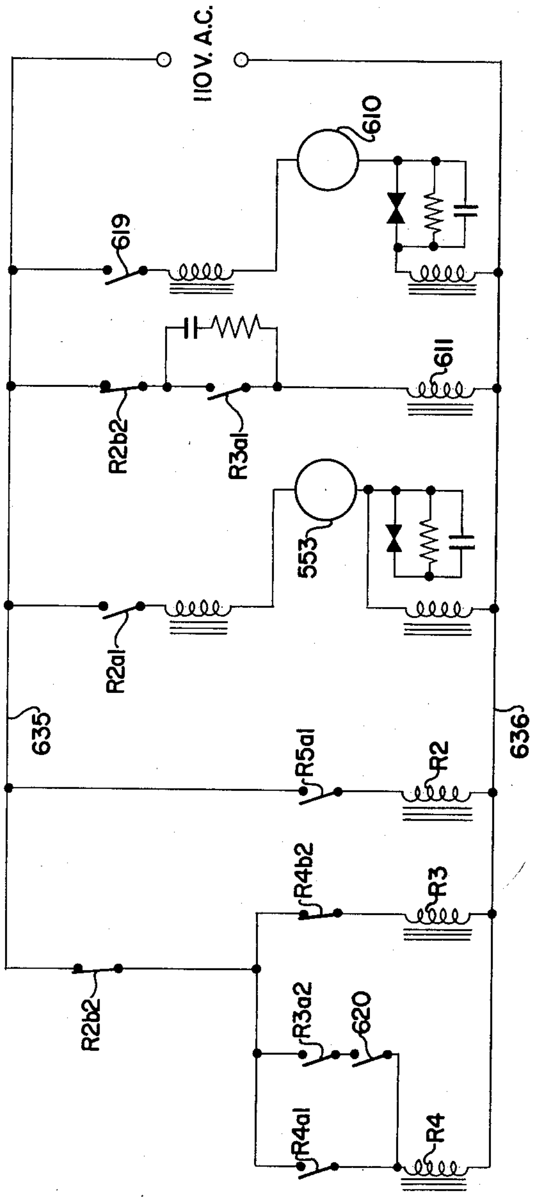

FIG. 6 shows certain operating circuitry not included in FIGS. 5A to 5E inclusive.

*General Description*

For illustration of a complete system in which the present invention may be embodied, reference may be had to the previously-cited parent application, Serial No. 349,297. Only so much of the structure disclosed in that application as is essential to an understanding of the present invention is included herein.

Forming a part of the present invention is a six-denominational-order electron-tube accumulator, into which amounts on the tape being sensed, which are related to a selected classification or code number, can be entered under control of the selecting means and can be accumulated to provide a total of the amounts related to this classification. The accumulator also contains a two-denominational-order electron-tube counter, which can count the number of amounts which were related to this classification number and which have been accumulated.

The accumulator and counter component controls the summary recorder unit at the end of a pass of the tape to set up on the recorder the total amounts which have been accumulated and the number of entries which have been made in the accumulator during that pass. The accumulator and counter component also can control the summary recorder unit to eliminate an operation of the summary recorder if no amounts have been accumulated during a pass.

The summary recorder unit includes an indicating portion, shown generally at 36, and a printing portion 37, in which indicator drums and type wheels, respectively, can be set under control of the selecting means of the master control panel and control chassis (not shown herein) according to the classification or code number which was used to control the selection of amounts in a pass of the tape, and can be set under control of the accumulator and counter component according to amounts accumulated therein.

The indicator and type wheel setting operation is initiated under control of means in the control chassis, at the end of a pass, if any amounts were accumulated during the pass. During the setting operation, the summary recorder controls the tape feed control means to prevent further feeding of the tape past the sensing means, but, as soon as the setting of the indicator wheels and type wheels has been finished, the tape feed is allowed to operate, and the printer portion is put into operation to print this data during the next pass of the tape. This overlapping of the printing of summary data resulting from one pass of the tape, and the sensing of data in the next pass of the tape, speeds up the operation of the machine to a marked degree.

*Detailed Description*

In this description of the preferred embodiment of the invention, certain tube types and certain values of potentials, resistors, and capacitors will be given; but it is to be understood that it is not intended to limit the invention to the embodiment described, nor to limit the circuit values and tube types to those specified, because these are merely selected as illustrative. It is obvious that other potentials and/or other similar types of tubes can be used and the circuit values of resistance and capacitance can be adjusted to maintain the proper relation between the various parts of the circuits. Throughout the circuit diagram, the heater elements for the tubes, the heater potential supplies, and the connections to the heater elements have been omitted to avoid possible confusion in the circuit diagram.

*Amount Accumulator*

Figure 5A:
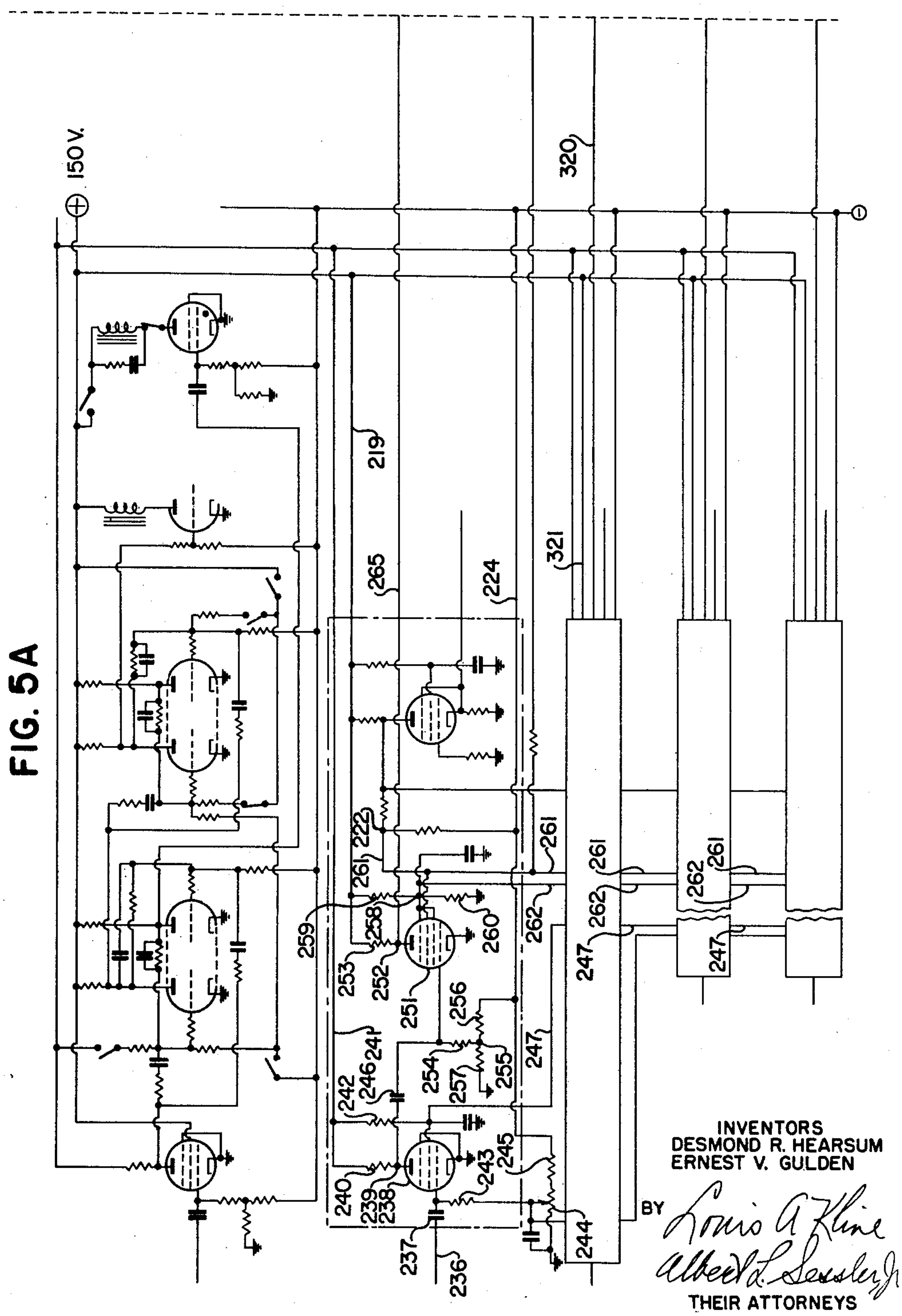

The amount accumulator and the entry controls therefor will now be described with reference to FIGS. 5A, 5B, and 5C. Since the entry controls and the accumulator circuits for the several orders are substantially the same, only those for the units order will be described in detail.

Negative impulses from the tape-sensing means, which is not shown herein but which is fully described in the parent application, Serial No. 349,297, are transmitted over the coaxial cable 236 (FIG. 5A) and are applied through a capacitor 237, of 100 micromicrofarads, to the control grid of an amplifier-shaper tube 238, of the 6AU6 type, which is operated essentially as a zero-bias amplifier.

Tube 238 has its anode connected over point 239 and resistor 240, of 100,000 ohms, to a +250-volt conductor 241; has its suppressor grid and cathode grounded; has its screen grid connected, together with the screen grids of the amplifier-shaper tube of the other orders, over a voltage-dropping resistor 242, of 50,000 ohms, to the +250-volt conductor 241, conduction in the tubes causing the screen grids to be held at about +60 volts; and has its control grid supplied with a −0.5-volt bias over a resistor 243, of 300,000 ohms, and a tap on the 10,000-ohm potentiometer 244, which is connected in series with a resistor 245, of 100,000 ohms, between a −105-volt conductor 224 and ground. The screen grids of the amplifier-shaper tubes of the other orders are also supplied with +60 volts over a conductor 247. The screen grids are also coupled to ground over an 8-microfarad capacitor, and the tap on the potentiometer is likewise connected to ground over a 4-microfarad capacitor.

The negative input impulses to the amplifier-shaper tube 238 will cause positive output impulses of the order of 70 volts to be generated at point 239 in the anode circuit and impressed, through a coupling capacitor 246, of 50 micromicrofarads, on a first control grid of the gate tube 251, which tube is of the 6AS6 type and, as explained earlier, is also controlled by the coincidence circuit of the selecting means.

The gate tube has its anode connected over point 252 and resistor 253, of 30,000 ohms, to the +150-volt conductor 219; has its cathode grounded; has its first control grid supplied with a negative bias of about −15 volts by being connected over a resistor 254, of 500,000 ohms, to point 255 in a potential divider, consisting of resistors 256 and 257, of 60,000 ohms and 10,000 ohms, respectively, connected in series between the −105-volt conductor 224 and ground; has its suppressor and shield grids connected together and supplied with +60 volts from point 258 in a potential divider, consisting of resistor 259, of 30,000 ohms, and resistor 260, of 20,000 ohms, connected between the +150-volt conductor 219 and ground; and has a second control grid connected over conductor 261 to point 222 in the coincidence circuit, which enables the coincidence circuit to control the output from the gate tube. The second control grids of the gate tubes serving other orders of the accumulator are also connected to conductor 261, so that the gates in all orders are controlled simultaneously and in like manner from the coincidence circuit.

Point 258 has a conductor 262 extending therefrom to the suppressor grids and shield grids of the other gate tubes to supply these grids with +60 volts. Point 258 is also coupled to ground over a 4-microfarad capacitor.

The control of the gate tube 251 is such that, when the code number which has been sensed disagrees with the code number stored in the apparatus, as described in the previously-mentioned parent application, Serial No. 349,297, the second control grid will be at −40 volts and will block the operation of the tube, so that input impulses impressed on the first control grid will be unable to cause output impulses to be generated at point 252 in the anode circuit of the gate tube 251. When the code number that is sensed agrees with the number stored in the apparatus, then the second grid of the gate tube will be at zero volts and will allow the tube to operate in response to input impulses to produce negative output impulses of about 50 volts at point 252 in its anode circuit.

The output impulses from the gate tube 251 are transmitted over conductor 265 (FIGS. 5A, 5C, and 5D) and capacitor 266 (FIG. 5B), of 250 micromicrofarads, to the left half **267*a*** of a twin triode of the 6J6 type, which left half of the triode forms the entry device for the units order of the accumulator.

The left half **267*a* of the tube has its anode connected over point 268 and resistor 269, of 15,000 ohms, to the +200-volt conductor 270; has its cathode connected to ground; and has its grid connected over a low-resistance parasitic suppressor resistor to the junction of a resistor 271, of 2.2 megohms, and a resistor 272, of 250,000 ohms, which are connected in series between the +200-volt conductor 270 and ground, and is supplied with a potential of about +20 volts therefrom. This half of the tube, consequently, is normally conducting but will be driven to cut-off by the −50-volt impulses from the gate tube 251, to produce about +100-volt impulses at point 268** in its anode circuit, which impulses are used to drive the electronic accumulator.

Each denominational order of the accumulator is made up of a ring of ten gaseous tetrodes of the GL–5663 type, interconnected in substantially the same manner as the ring shown in United States Patent No. 2,515,448, issued July 18, 1950, to Ernest V. Gulden. In order to simplify the disclosure, only the "0," "1," "8," and "9" tubes and related circuits for the units denominational order are shown, because the circuits for the remaining tubes of the ring are the same as those shown, and their operation will be clear from what is described. Similarly, the rings of the other orders are the same as the units order, and their operation will be clear from a description of this order.

The anodes of the tubes are connected together and over a common resistor 276, of 5,000 ohms, to a +105-volt conductor 277, which is connected to the terminal 280 over point 278, a local clear key 279, and the normally open contact CO*a*1 of relay CO (not shown), which relay is operated to close the contact whenever power is applied to the apparatus and the heaters of the tubes have had time to become properly heated.

The cathode of each tube is connected to ground over two circuits; the circuits for the "0" tube, for instance, extend over a resistor 281, of 20,000 ohms, to ground, and also extend to ground over a resistor 282, of 2,500 ohms, point 283, and capacitor 284, of .005 microfarad, in series.

The shield grid is connected over a resistor 285, of 47,000 ohms, to point 286, which is coupled over a capacitor 287, of ten micromicrofarads, to an input conductor 288, which is connected to the point 268 in the anode circuit of the half 267*a* of the twin triode, and which is connected over a resistor 289, of one megohm, to the conductor 290, which is supplied with a voltage of about −25 volts from the tap of a 50,000-ohm potentiometer 291 (FIG. 5C), connected in series with resistors 292, of 15,000 ohms, 293, of 25,000 ohms, and 294, of 25,000 ohms, between the −75-volt conductor 295 and ground. The tap is also coupled to ground over a stabilizing capacitor.

The control grid is connected over a resistor 296, of 1.5 megohms, to the −75-volt conductor 295, and is also connected over a resistor 297, of 1.3 megohms, to the cathode of the preceding tube of the ring, which, in the case of the "0" tube, is the "9" tube. This connection to the preceding tube of the ring enables conduction in a tube of the ring to prime the next tube in the ring for response to the next input impulse on the input conductor.

The operation of the ring is such that, with any tube of the ring conducting, an input impulse will cause the next tube to fire, and the firing of this next tube will cause the previously-conducting tube to be extinguished, so that, at any time, only that tube will be conducting which represents the digit standing in the order of the accumulator. As explained in connection with the storage chains, the potential of the cathode of the conducting tube will be more positive than that of the other tubes, and connections from points, as point 283 in the "0" tube cathode circuit, extend to the summary recorder to provide the controls, so that the total amounts related to a code number can be printed.

Means are provided to preset the accumulator to zero condition before each pass of the tape, so that the amount in the accumulator at the end of a pass will correspond to the total of all amounts on the tape which are related to the code number stored in the apparatus. The presetting controls include connections from the +200-volt conductor 270 over normally-open contacts of the relay A1 (not shown herein), such as A1*a*2 (FIG. 5B), for the units denominational order, and over resistor 298, of one megohm, to the control grid of the "0" tube. The relay A1, which is energized momentarily just before each pass of the tape, closes the contacts A1*a*2 to A1*a*7, of which only the contacts A1*a*2 are shown, to apply the +200 volts momentarily to the control grids of the "0" tube in each of the denominations of the accumulator to cause these tubes to fire and extinguish any other tube of the ring which might have been conducting. The controls for momentary energization of the relay A1 are fully described in the previously-cited parent application, Serial No. 349,297.

Means are provided in the accumulator for effecting tens transfers between adjacent denominational orders. Inasmuch as amount entries may be made simultaneously in all orders of the accumulator, a delayed-entry type of transfer means is provided, in which the required tens transfers are stored during the amount entry period, and the actual transfers are effected subsequently to the time in which amount entries are made. The transfer means between the units and tens orders is representative of the transfer means between the four lower orders of the accumulator.

A transfer storage tube 305 is provided for storing any transfer which may be required due to the value in the order reaching zero, or passing through zero, during the amount-entering operation of the accumulator. This tube is a gaseous tetrode of the GL–5663 type. It has its anode connected over an individual resistor 306, of 250 volts, to a conductor 307, which is common to the anodes of all the transfer storage tubes.

Conductor 307 is connected over point 308, resistor 309, of 250 ohms, resistor 310, of 100 ohms, normally-closed relay contacts A1*b*1, and conductor 311 to point 278, and is supplied with +105 volts therefrom.

The shield grid is connected to the cathode, and both are connected to ground over two circuits, one over point 312 and resistor 313, of 20,000 ohms, and the other over a capacitor 314, of .005 microfarad, and resistor 315, of 2,500 ohms, in series.

The control grid of tube 305 is connected over point 316 and a resistor 317, of 500,000 ohms, to conductor 322*a*, which extends to a tap on a 50,000-ohm potentiometer 323 (FIG. 5B), from which it is supplied with a bias of about −13 volts, which potentiometer is connected between the −75-volt conductor 295 and ground, and has its tap coupled to ground over a capacitor of .25 microfarad.

Point 316 in the control grid circuit is coupled over a capacitor 319, of 25 micromicrofarads, to the cathode of the "0" tube.

The transfer storage tube 305 is normally non-conducting, but will be fired by an impulse derived from the cathode of the "0" tube as the "0" tube becomes conducting. The transfer storage tube will continue to conduct after the amount-entering operation, and will control a transfer device to enable a tens transfer to be effected subsequently to the amount entry.

The relay contacts A1*b*1 in the anode potential supply circuit for the transfer storage tubes are opened when relay A1 (not shown) is energized, and this disables the transfer storage tubes, so that these tubes will not be fired when the "0" tubes are fired, as the accumulator is preset to "0."

The transfer device of the units denominational order, the right half 267*b* of the twin triode, is connected in parallel with the gate tube of the tens denominational order by having its anode connected over resistor 322, of 1,000 ohms, to the conductor 320 from the gate tube of the tens denominational order and thence over the anode resistor, which is similar to resistor 253 of the units order, to the +150-volt anode potential supply conductor 321, and by having its cathode connected to ground. Each time the transfer device conducts, it will cause an impulse to be impressed on the control grid of the entry device of the tens denominational order to cause a value of "one" to be entered in this order.

The transfer device has its control grid connected over resistor 325, of 120,000 ohms, resistor 326, of 250,000 ohms, and conductor 327 to a tap on a 50,000-ohm potentiometer 328, connected between the 75-volt conductor 295 and ground, and is supplied with a normal bias of about −50 volts. The tap is coupled to ground over a .25-microfarad stabilizing capacitor. The conductor extends to the control grids of the other transfer devices and supplies them with this bias potential. The control grid of the transfer device of the units order is also connected over a resistor 329, of 470,000 ohms, to point 312 in the cathode circuit of the transfer storage tube 305, which connection enables the transfer storage tube to control the bias on the transfer device to control when the transfer device can respond to transfer-effecting impulses which are impressed on the control grid from a transfer-actuator chain. The control over the transfer device is such that, when the transfer storage tube is non-conducting, indicating that no transfer is required, its cathode will be at a lower potential and will maintain the bias on the control grid of the transfer device at a value where the transfer device will not become conducting in response to the transfer-effecting impulses; but, when the transfer storage tube is conducting, indicating that a transfer is required, its cathode will be at a higher potential and will modify the bias on the control grid of the transfer device to enable the transfer device to conduct in response to a transfer-effecting impulse and cause a value of "one" to be entered in the next higher order.

Since there are only four amount channels on the tape of the embodiment disclosed in the parent application, Serial No. 349,297, entries in the fifth and sixth orders of the accumulator are made only as the result of tens transfer operations from lower orders.

Figure 5B:
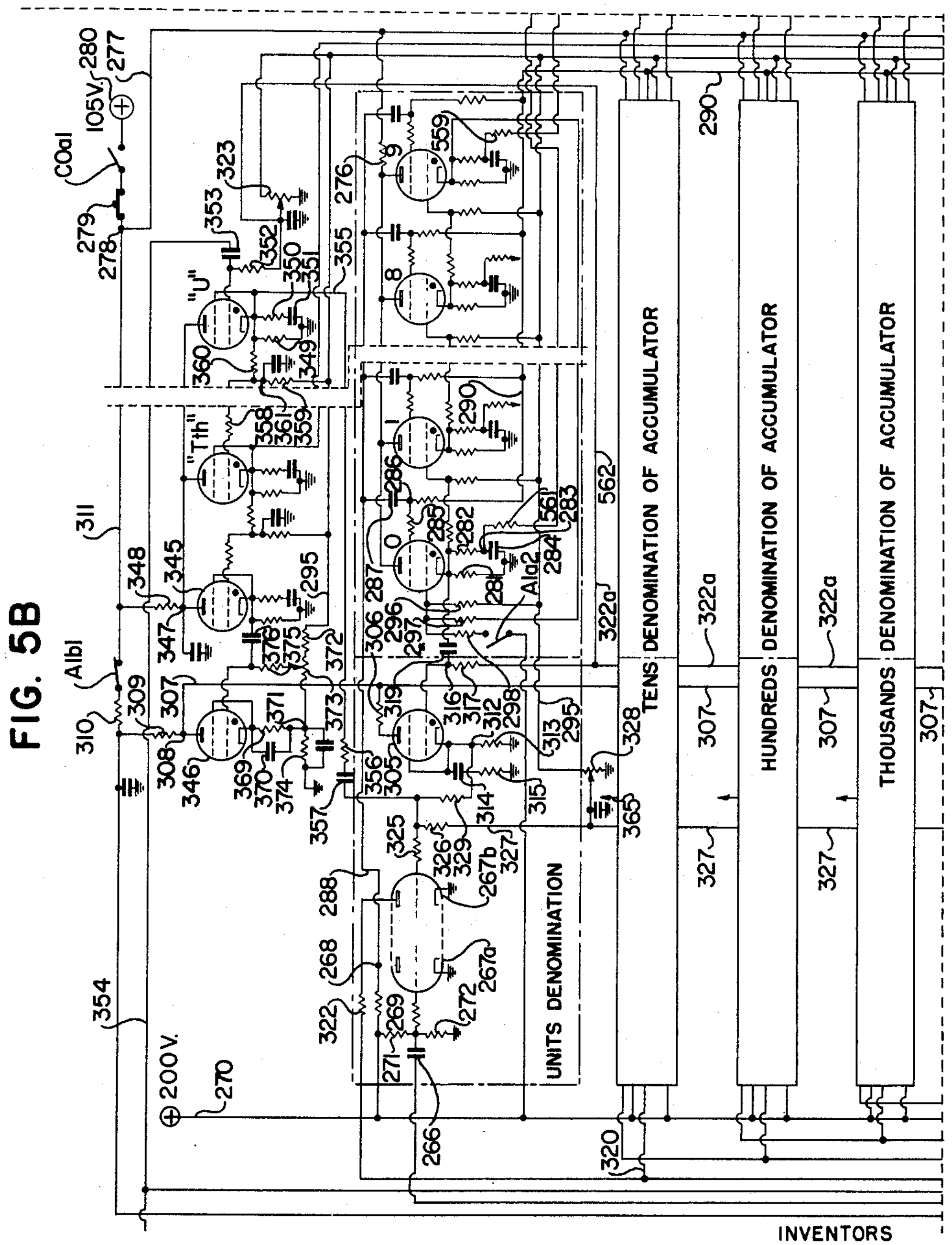
Figure 5C:
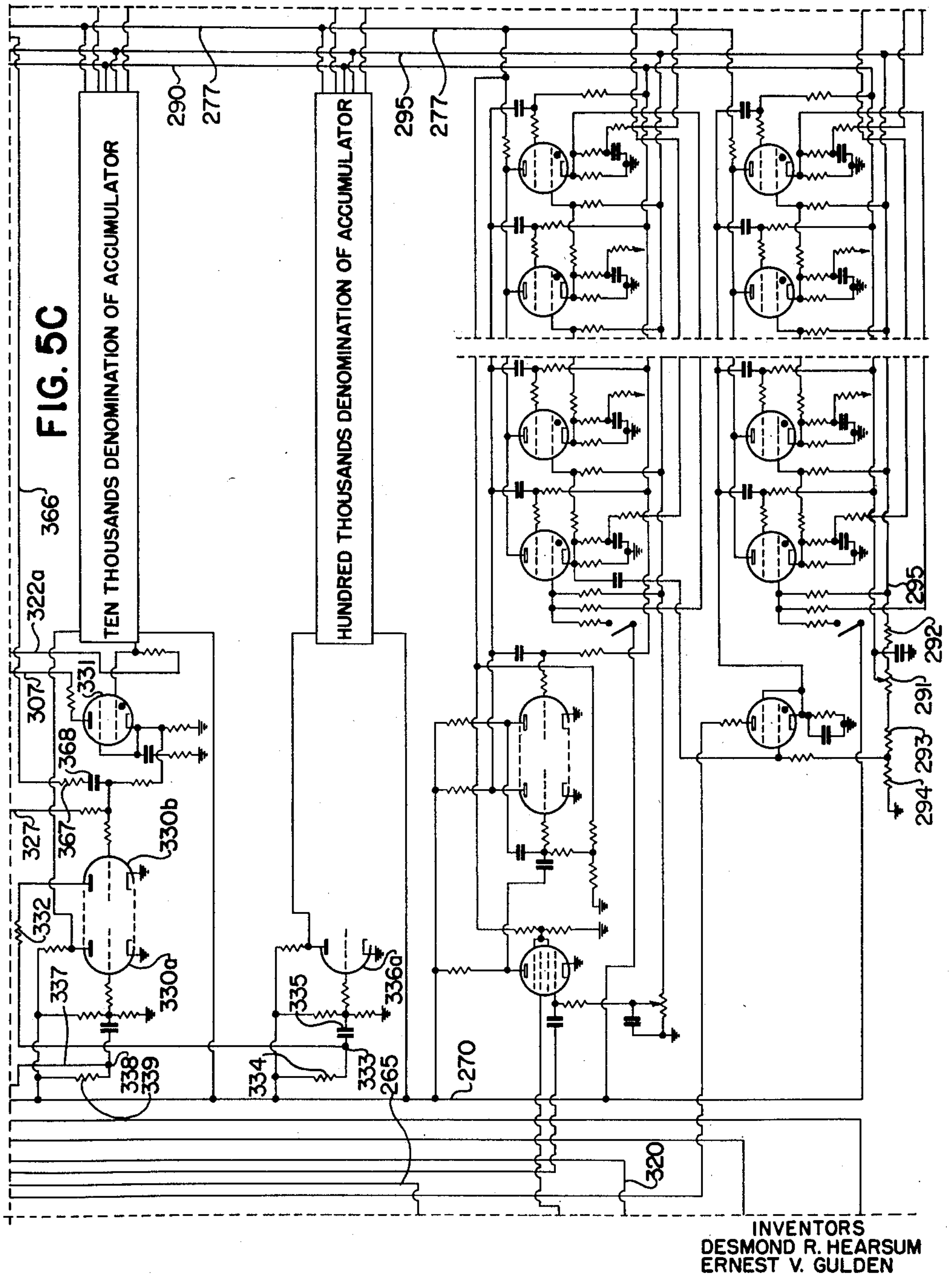

As shown in FIG. 5C, the fifth, or ten thousands, order is provided with an entry device 330*a*, a transfer device 330*b*, and a transfer storage tube 331.

The transfer storage tube 331 operates in the same manner as tube 305 to control the transfer device 330*b*. The transfer device 330*b* operates in substantially the same manner as the transfer device 267*b*, but has its anode connected over resistor 332, of 1,000 ohms, point 333, and resistor 334, of 30,000 ohms, to the +200-volt conductor 270. Point 333 is coupled over capacitor 335, of 250 micromicrofarads, to the control grid of the entry device of the sixth, or hundred thousands, order. Each time the transfer device of the fifth order conducts, it will cause a negative impulse to be generated across the resistor 334, which impulse, when impressed on the entry device 336*a*, will cause it to operate and enter a value of "one" in the sixth order.

The entry device 330*a* of the fifth order is controlled from the transfer device of the fourth, or thousands, order, which transfer device has its anode connected over a resistor of 1,000 ohms (not shown), conductor 337, point 338, and resistor 339, of 30,000 ohms, to the +200-volt conductor 270, and will produce a negative impulse at point 338 each time it conducts.

Inasmuch as the sixth order is the highest order of the accumulator of the instant embodiment, no provision is made for transfers to a higher order, and the transfer storage tube in the transfer device has been omitted.

The transfer-effecting impulses are obtained from a chain of transfer-actuator tubes, shown near the top of FIG. 5B. The chain includes five tubes for operating the transfer devices to cause entries in the tens, hundreds, thousands, ten thousands, and hundred thousands orders in succession, if required, and a delay tube for operating a restoring tube, which, when operated, restores any operated transfer storage tubes to their unoperated condition. In FIG. 5B, only the units order tube "U," the ten thousands order tube "TT*h*," the delay tube 345, and the restoring tube 346 are shown; the tubes for causing transfer entries in intervening orders of the accumulator and their related circuits, being similar to the ones shown, have been omitted from the diagram in order to avoid duplication of the circuits.

The tubes of the chain, beginning with the "U" tube and ending with the delay tube 345, are gaseous tetrodes of the GL–5663 type. These tubes have their anodes connected together and over point 347 and resistor 348, of 5,000 ohms, to the +105-volt conductor 311. Point 347 in this circuit is also coupled to ground over a capacitor of 100 micromicrofarads.

The shield grid and the cathode of each tube are connected together and to ground over two circuits. The circuits for the "U" tube are representative, one extending to ground over a resistor 349, of 20,000 ohms, and the other extending to ground over a resistor 350, of 2,500 ohms, and capacitor 351, of .005 microfarad, in series.

The circuit to the control grid of the "U" tube, which is the first tube of the chain, is different from the circuits to the other control grids and extends over a resistor 352, of 470,000 ohms, to the tap on potentiometer 323, from which the grid is supplied with a bias of about −13 volts, and extends over a capacitor 353, of 25 micromicrofarads, and conductor 354 to an operating flip-flop, which is not shown herein but which is fully disclosed in the previously-mentioned parent application, Serial No. 349,297, and from which it receives an impulse to initiate an operation of the chain under control of the control perforations of the tape, in a manner fully described in said previously-mentioned parent application.

The cathode of the "U" tube is connected over conductor 355, resistor 356, of 47,000 ohms, and capacitor 357, of 500 micromicrofarads, to the control grid of the transfer device 267*b* of the units order, which connection transmits the cathode potential rise of the "U" tube as an impulse to the transfer device, to cause it to conduct, if its related transfer storage tube is conducting, and impress a negative impulse on the entry device of the tens denominational order to cause an entry of "one" therein.

The second tube of the chain has its control grid connected to the −75-volt conductor 295 over a resistor of one megohm (not shown, but similar to resistor 358 for the "TT*h*" tube) and resistor 359, of 1.5 megohms. This control grid is also connected to the cathode of the "U" tube over a resistor 360, of one megohm, which connection enables the cathode potential rise of the "U" tube to fire the "T" tube, the next tube in the chain, automatically. Point 361 in this control grid circuit is coupled to ground over a 250-micromicrofarad capacitor, which delays the firing of the "T" tube by the "U" tube long enough for the transfer storage tube in the tens order to be operated if a further tens transfer requirement results from the transfer entry.

When the "T" tube of the chain fires, it will cause the "U" tube to be extinguished, will send a transfer actuating impulse over conductor 365 (only a portion of which is shown in FIG. 5B) to the transfer device of the tens denominational order, and will also, after a suitable delay, fire the "H" tube of the chain.

The sequential firing of the tubes of the chain will continue automatically, and, as each tube is fired, it will send a transfer-effecting impulse to the transfer device of its related order to cause the transfer device to operate if its related transfer storage tube is conducting, the connection of the last transfer-actuator tube extending from the cathode of the "TT*h*" tube over conductor 366, resistor 367, and capacitor 368 to the control grid of the transfer device 330*b* of the ten thousands order.

With the firing of the tube "TT*h*" of the chain, all possible transfer entries will have been made. The tube "TT*h*" also fires the delay tube 345, which in turn fires the transfer storage restoring tube 346 to restore any conducting storage tube to non-conducting condition.

The restoring tube 346 is a gaseous tetrode of the type designation 2D21. This tube has its anode connected to point 308 in the anode circuit for the transfer storage tubes. The shield grid and the cathode are connected together and over resistor 369, of 75,000 ohms, and capacitor 370, of .015 microfarad, in parallel, to point 371 in a potential divider extending from the −75-volt conductor 295 to ground over resistor 372, of 10,000 ohms, the 10,000-ohm potentiometer 373, point 371, and resistor 374, of 25,000 ohms, from which point they are supplied with a potential of about −40 volts. Point 371 is coupled to ground over a stabilizing capacitor.

The control grid of tube 346 is supplied with a bias of about −48 volts by being connected over a resistor 375, of 500,000 ohms, to the tap on the potentiometer 373, and is also coupled to the cathode of the delay tube 345 over a capacitor 376, of 25 microfarads. When the delay tube 345 is fired, its cathode potential rise is impressed on the control grid of the restoring tube as a firing impulse and will cause the restoring tube to fire and become conducting. As the restoring tube is fired, its anode potential and that of conductor 307 will become negative, causing the potential of the anodes of the conducting transfer storing tubes to drop below that of their cathodes and the tubes to be extinguished. The circuit constants of the operating circuit for the restoring tube are such that the tube will automatically extinguish shortly after it has been fired to restore any transfer storage tubes which may have been operated.

Accordingly, it is seen that, in the operation of the transfer means, any tens transfers that are indicated during the amount-entering operation are stored in the transfer storage tubes, which tubes prepare tens transfer devices for operation. After the amount-entering operation, the operation of the transfer actuator chain is initiated to generate transfer-effecting impulses, which are impressed on the transfer devices one after another from lower to higher order, to cause the required transfer entries to be made. After all required transfer entries have been made, the restoring tube 346 operates to extinguish any transfer storage tubes which may have been rendered conducting to store required transfers, and the transfer means is made ready for another operation.

*The Summary Recorder*

The summary recorder for indicating and printing the code number which was used during a pass of the tape, the total of amounts on the tape, which were related to this code number, and the number of amounts which were accumulated to form this total is shown in FIGS. 1A, 1B, 2, 3, 5D, and 6.

This recorder is essentially the same as the one shown in the United States Patent No. 2,682,995, issued on July 6, 1954, to Edward J. Carey and Desmond R. Hearsum, and only so much of the recorder will be described as is necessary for an understanding of the instant invention.

Figure 1A:
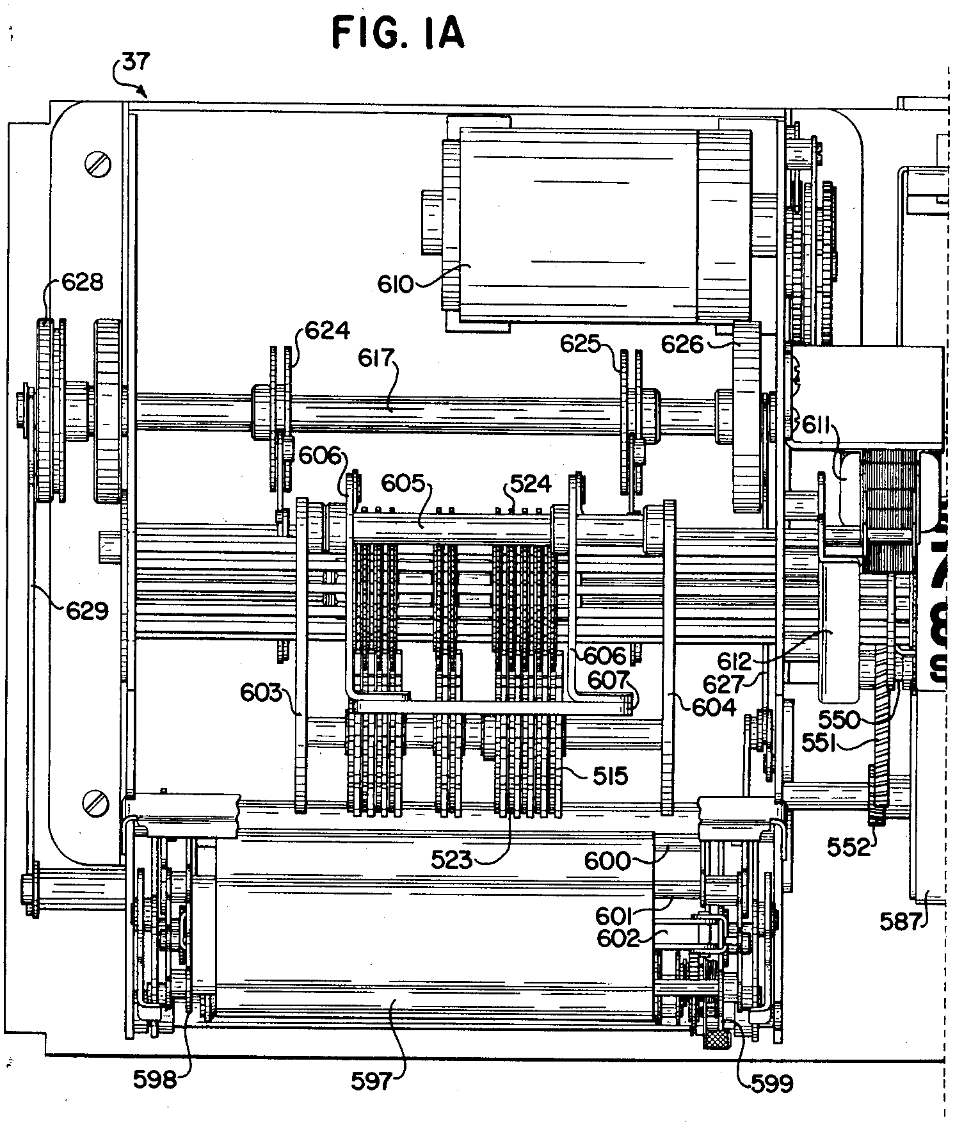
Figure 1B:
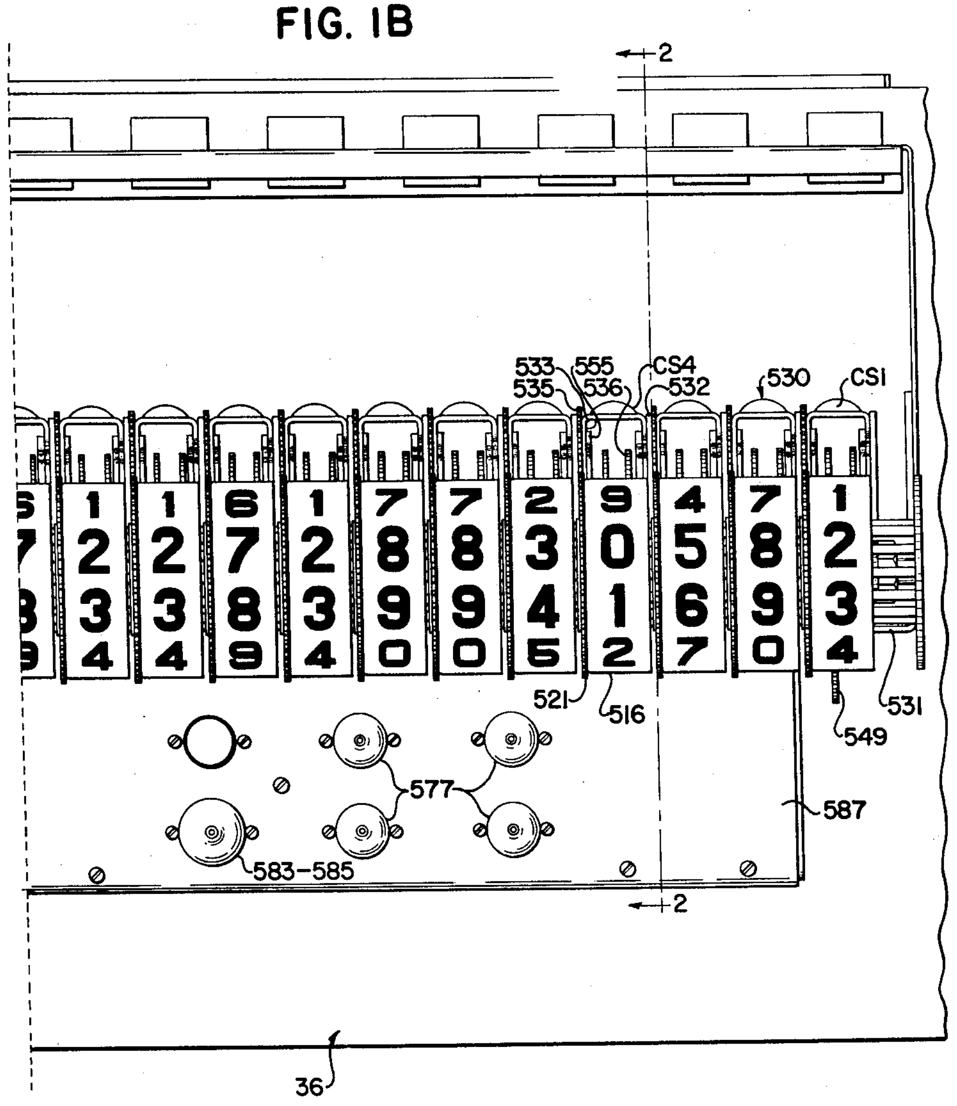

As shown in FIGS. 1A and 1B, the printer portion 37, which is located at the left of the summary recorder, is provided with a plurality of type wheels 515, and the indicator portion 36, which is located at the right of the recorder, is provided with a plurality of indicator drums 516.

In FIGS. 1A and 1B, the first four indicator drums at the left indicate the four digits of the code number, the next two drums indicate the item count, and the six drums at the right indicate the six digits of the amount. Similarly, the four type wheels at the left print the code number, the two in the center print the item count, and the five at the right print five digits of the total.

Each of the type wheels 515 and indicator drums 516 is provided around its periphery with indicia according to the digits of the notation. In the case of the indicator drums 516, they can be rotated to bring desired digits into viewing position, opposite a window (FIG. 2) in the cabinet which encloses the summary recorder; and, in the case of the type wheels, they can similarly be located to bring the desired digits into printing position.

A system of gearing connects the related indicator drums 516 and type wheels 515 for simultaneous movement to various ones of their positions, so that a related indicating drum and type wheel will be set with the same digit in indicating and printing positions, respectively. This gearing, which is shown in FIGS. 1A, 1B, 2, and 3, includes a pair of supporting shafts 517 and 518 and a plurality of bearing disks 519, spaced thereon across the machine, and includes a plurality of individually-rotatable square transmission rods, as 520, which extend across the recorder and are supported in the bearing disks and in suitable supporting plates secured to various side frames of the recorder.

In the embodiment shown, there are twelve indicator drums but only eleven rods 520, so the drum of the highest order of the accumulated amount, the sixth drum from the right in FIG. 1B, has no connection to a type wheel, and only five digits of the amount will be printed. There is a transmission rod 520 for each of the other related indicator drums and type wheels, a drum and its related type wheel being coupled to their related rod for similar movement, as follows:

The indicator drum 516 (FIG. 2), which is the drum for indicating the thousands digit of the amount, has secured thereto a gear 521, which has external and internal teeth, the internal teeth engaging the outside of the bearing disk 519, which serves as a bearing for the gear 521 and for the rods 520. Adjacent the rod 520 which is related to this particular drum, the disk 519 is recessed to receive a gear 522, which is mounted on the rod 520 to rotate therewith and is in alinement with the gear 521 and meshes with its internal teeth. Retaining plates of larger diameter than the disk are mounted on either side of the disk, and close thereto, to keep the gears 521 and 522 in alinement.

Figure 2:
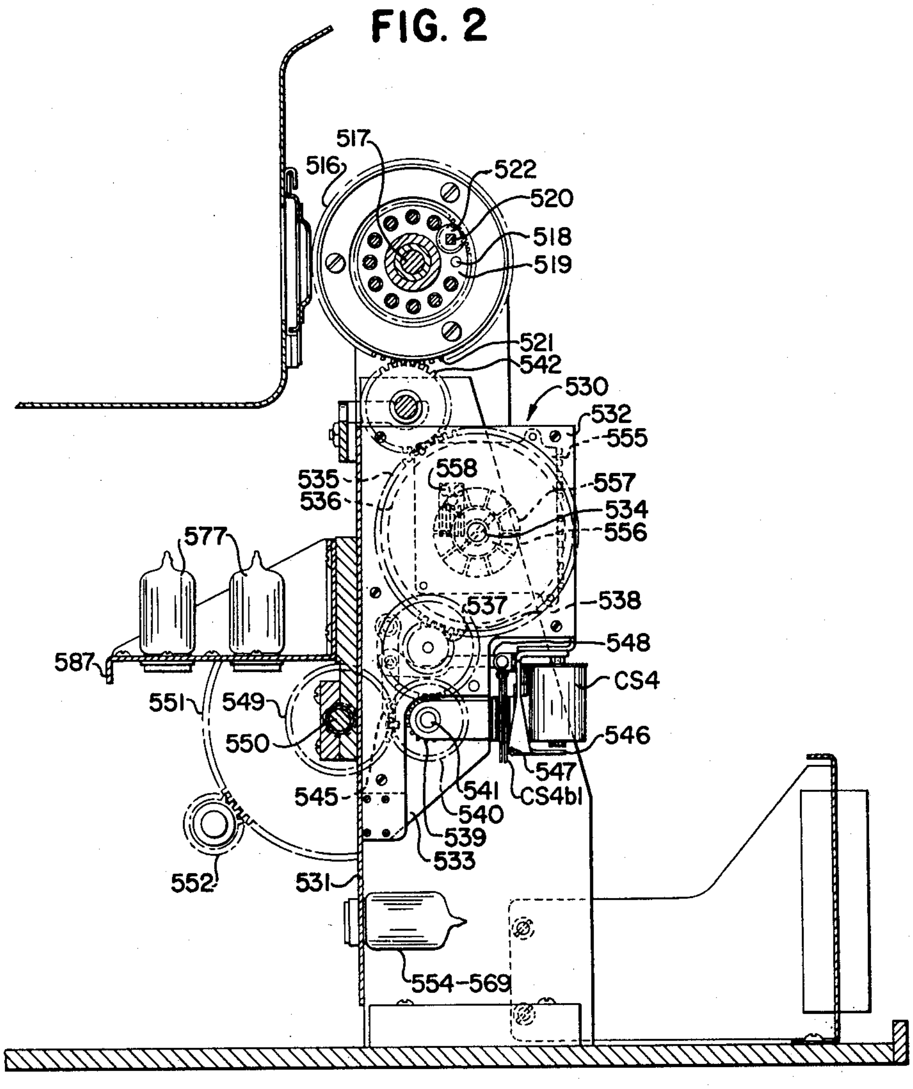
FIG. 2 is a vertical section through the indicating mechanism of the summary recorder, showing the driving means and the controls for setting one of the indicator drums and its related type wheel.

The type wheel 515 which is related to the drum 516 shown in FIG. 2 is the fourth wheel from the right, as shown in FIG. 1A. This type wheel has a gear 523, which meshes with the external teeth of an external-internal gear 524 (see also FIG. 3), similar to the gear 521. The internal teeth of the gear 524 engage a bearing disk 525, which is recessed to receive a gear 526, which is mounted on the rod 520, in alinement with the gear 524, and meshes with its internal teeth. Retaining plates on either side of the bearing disk retain the gears 524 and 526 in alinement.

The above train of gearing between the drum and its related type wheel, including gears 521 and 522, transmission rod 520, and gears 523, 524, and 526, connects the drum and the type wheel for corresponding movement.

A similar train of gearing, utilizing different ones of the transmission rods, as 520, connects each of the other type wheels and related drums for corresponding movement.

Driving means, and sensing means for controlling the operation of the driving means, are provided to position the various related indicator drums and type wheels according to the code number stored in the apparatus, the total on the accumulator, and the amount in the counter. The driving means and the sensing means for each of the related indicator drums and type wheels are contained in a unit, as 530, the units being mounted side by side and secured to a front supporting plate 531 in the indicator portion 36 of the summary recorder, as shown in FIGS. 1B and 2.

Since all the units, as 530, are of the same construction, their operation will be clear from the following description of one of them. The unit is constructed and operates substantially the same as the one which forms the subject matter of United States Letters Patent No. 2,617,870, which issued to Jack I. Kern on November 11, 1952, and to which patent reference may be made for further details, if desired.

Each unit is self-contained within a pair of side walls 532 and 533 (FIGS. 1B and 2). The driving means includes a shaft 534, journaled in the side walls, which shaft has a driving gear 535 secured to one end thereof, and also has secured thereto a pair of brush carriers 536, the gear 535 being connected through gears 537 and 538, which are connected together by their supporting shaft, to the output gear 539 of a single-revolution clutch to be driven thereby whenever the clutch is operable to couple the drive to the unit.

The clutch, including its driving gear 540 and output gear 539, is mounted on a shaft 541, carried by a bracket secured to the side wall 533.

The ratio between the gears 535, 537, 538, and 539 is such that the gear 535 will make one tenth of a rotation for each rotation of the gear 539.

The gear 535 is connected through an intermediate gear 542 to the gear 521, which is connected to the indicator drum and will drive the drum and related type wheel one tenth of a revolution, to bring a different digit to indicating and printing position, for each rotation of the gear 539.

The single-revolution clutch is controlled by a clutch trip lever 545, which is pivoted on a stud between the side walls 532 and 533 of the unit and can move between a clutch-disengaging position, in which it retains the clutch disengaged, and clutch-engaging position, in which the clutch is allowed to couple the drive to the unit.

The position of the clutch trip lever 545 is controlled by a clutch control solenoid, as CS4 in FIG. 2, which is mounted on a bracket extending from the side frame 533. An armature 546, pivoted at point 547, has one end connected by a link 548 to the clutch trip lever 545. Resilient contacts CS4*b*1, which are normally closed, urge the armature clockwise (FIG. 2) to position the trip lever 545 in its clutch-disengaging position. Whenever the clutch control solenoid, as CS4, is energized, it will rock the armature 546 counter-clockwise (FIG. 2) to open contacts CS4*b*1 and also move the clutch trip lever 545 to clutch-engaging position, to allow the clutch to couple the drive to the unit.

The driving gears, as 540, of the clutches of the various units mesh with corresponding gears, as 549, on a common drive shaft 550, which is mounted on a front plate 531 and is driven through gears 551 and 552 (FIGS. 1A, 2, and 3) by a motor 553, which operates in a read-out operation.

The sensing means includes a commutator 555 (FIGS. 1B and 2), which is secured on the inside of the wall 533 and which has a central collector ring 556, concentric with the shaft 534, and ten segments 557, spaced equally about the collector ring.

A sensing brush 558, carried by the brush carrier 536, connects the segments to the ring 556, one after another in succession as the carrier 536 rotates, each rotation of the gear 539 causing the brush to move to the next segment.

Figure 5D:
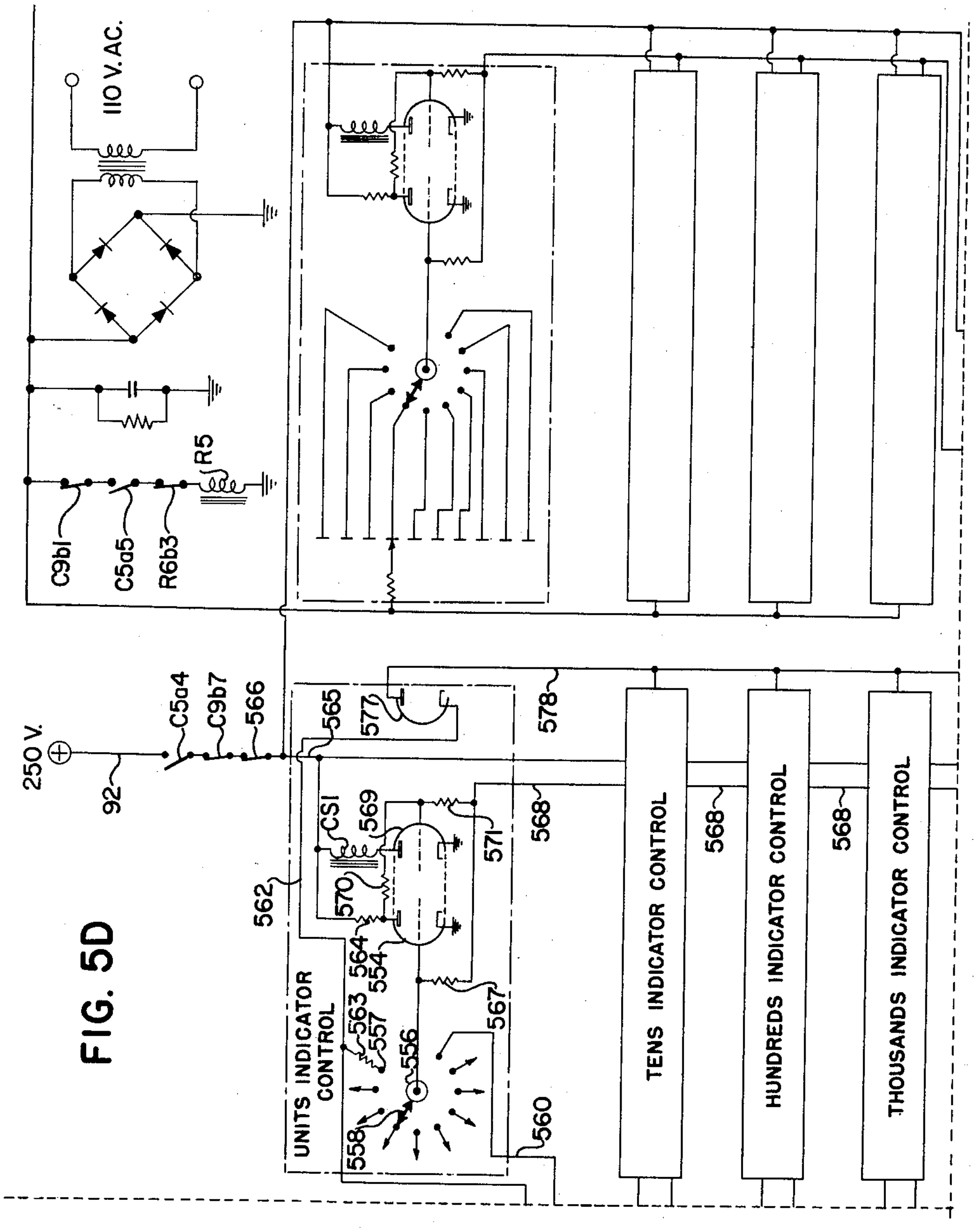
Figure 5E:
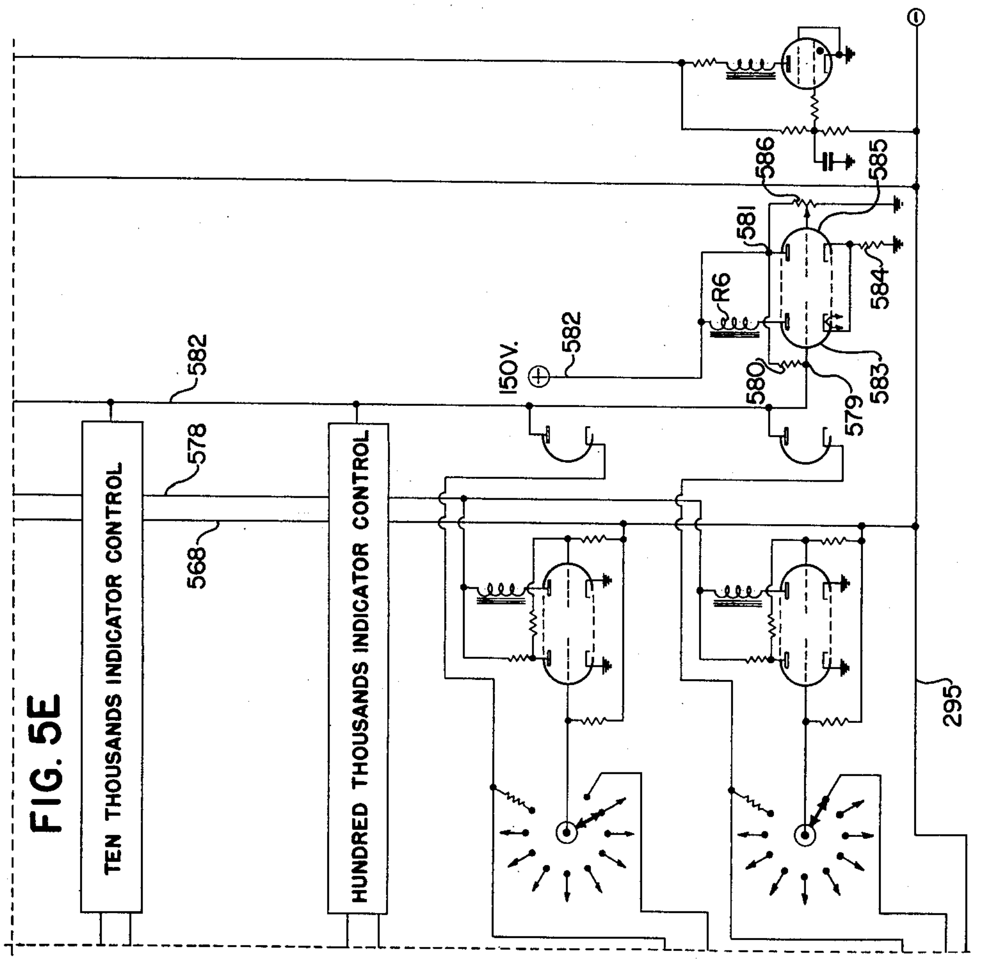

The manner in which the sensing means controls the drive is shown most clearly in the circuit diagram, and in particular in FIGS. 5B and 5D, which show in detail the control for setting the indicator drum and the type wheel according to the units digit of the accumulated amount.

The cathodes of the tubes of the counting ring of the units denomination of the accumulator are connected to corresponding segments of the commutator, only the connections from the cathodes of the "0" and "9" tubes being shown, in order to simplify the diagram. The connection from the cathode of the "9" tube to the "9" segment of the commutator extends over a resistor 559, of 250,000 ohms, and conductor 560, which connection is similar to those between the "1" to "8" tubes and their related segments, and the connection from the cathode of the "0" tube to the "0" segment of the commutator extends over a resistor 561, of 100,000 ohms, conductor 562, and resistor 563, of 150,000 ohms. Because the conductor 562 also extends to a further circuit for eliminating a read-out and printing operation when the accumulator and the counter stand at "zero", this resistor 563 is included in the circuit between the conductor 562 and the "0" segment 557, to prevent potentials which are applied to the segment by the sensing brush in "0" position from interfering with the control over the circuit for eliminating a read-out and printing operation.

As explained earlier herein, the particular tube of a ring which is conducting and represents the digit standing in that order will have its cathode more positive than the other tubes of the ring; accordingly, the segment of the commutator which is connected to the conducting tube will have a more posiive potential than the rest.

The central collector ring 556 of the commutator is connected to the control grid of a first control tube 554, which is the left section of a 6J6 type of tube. This control tube 554 has its anode connected over a resistor 564, of 100,000 ohms, to the read-out anode potential supply conductor 565, which is connected over a switch 566, which is closed except during a printing operation, and relay contacts C9*b*7 and C5*a*4 in series to the +250-volt conductor 92. Contact C5*a*4 in this circuit will enable the read-out controls to be operable during a turn-around operation, while relay C5 is energized. Switch 566 in this circuit is open during the printing operation to prevent any change in the setting of the type wheels at this time, and relay contacts C9*b*7 are opened when relay C9 is energized during a "Manual-Run" operation, to prevent a read-out during the starting or at the end of a manual run. The relays C5 and C9, which control the contacts C5*a*4 and C9*b*7, respectively, are not disclosed in this application, but for a complete description of these relays, reference may be had to the previously-cited parent application, Serial No. 349,297.

The cathode of the control tube 554 is connected to ground, and the control grid is connected over a resistor 567, of one megohm, and conductor 568 to the −75-volt conductor 295.

The control tube 554 controls a clutch solenoid operating tube 569, which is the right section of the 6J6 tube. The solenoid operating tube 569 has its anode connected over the winding of the clutch solenoid CS1 to the anode potential supply conductor 565, has its cathode grounded, and has its control grid connected over a resistor 570, of 470,000 ohms, to the anode of its related control tube and over a resistor 571, of 470,000 ohms, to conductor 568, from which it is supplied with a potential of −75 volts.

The operation of the sensing means to control the setting of the indicator and type wheel is as follows.

Whenever anode potential is supplied to the control tubes and the clutch solenoid operating tubes, and whenever the brush 558 is on a segment 557 which does not have the positive potential applied thereto, the first control tube 554 will be biased to cut-off, and its anode potential will be high. This high potential, which is applied to the control grid of the clutch solenoid operating tube 569, causes it to conduct and energize the solenoid CS1, which releases the clutch to connect the sensing means to the drive for movement to the next segment. If the next segment does not have the positive potential applied thereto, the clutch solenoid will again be energized and the sensing means will be moved to a further segment. This repeated energization of the clutch solenoid will continue until the brush engages the segment which is connected to the conducting tube of the ring. When the brush 558 engages this segment which has the positive potential applied thereto, the control tube will conduct, and the drop in potential of its anode will cause the clutch solenoid tube to be biased to cut-off, deenergizing the clutch solenoid CS1 and preventing further movement of the sensing brush. As the brush is moved from segment to segment, the indicator drum and the related type wheel will be driven to bring to indicating and printing position a digit correspondng to the value of the segment on which the brush is standing.

The control of the summary recorder from the item counter is the same as the control from the accumulator. The control from the stepping switches which store the code number in the apparatus is disclosed in the previously-mentioned parent application, Serial No. 349,297.

It will be recalled that, when the clutch solenoids were energized, they opened their related contacts CS1*b*1 to CS12*b*1. One or more of these contacts will be opened until all of the indicator drums and type wheels have been set. As soon as all these contacts are closed, they will complete a circuit which will initiate an operation of the printer portion 37 of the summary recorder, in a manner explained fully in the previously-mentioned parent application, Serial No. 349,297, to cause the data to be printed on the summary tape.

The control tube 554 and the clutch solenoid operating tube 569, which are the halves of a twin triode and which control the operation of the units, are mounted on the plate 531 just below the related unit, as shown in FIG. 2.

At the beginning of each pass of the tape, the accumulator and the counter are cleared and reset to zero when the relay contacts A1*a*2 to A1*a*9 are closed momentarily. If, during the pass of the tape, no entries thereon were sensed which were related to the code number set on the stepping switches, then no amount would have been entered into the accumulator, and the counter would not have been operated, leaving both in their zero condition. Under these circumstances, it is desirable to eliminate the read-out operation and the printing operation of the summary recorder and to provide necessary controls to bring about immediately those further operations of the machine which normally follow a read-out operation.

In addition to controlling the position of the indicator drums and type wheels in a read-out operation, the conductors, as 562, from the "0" tubes of the accumulator and counter also are effective to control a further circuit for preventing the read-out and printing operations and for providing the necessary control signals. The conductors, as 562, extend to the cathodes of diodes, as 577, each of which constitutes one half of a 6AL5 tube. The anodes of the diodes are connected together by conductor 578 and over point 579 (FIG. 5E), resistor 580, of 20 megohms, and point 581 to the +150-volt conductor 582.

This circuit, which includes the diodes, is used to control the conductivity of an eliminate relay operating tube 583, which is half of a 2C51 type tube and which, when conducting, energizes the eliminate relay R6.

Tube 583 has its anode connected over the winding of relay R6 to the +150-volt conductor 582, has its control grid connected to point 579 in the anode circuit of the diodes, and has its cathode connected to ground over a resistor 584, of 5,000 ohms.

Bias is supplied to tube 583 by a tube 585, which constitutes the other half of the 2C51 type tube. The tube 585 is connected in parallel with the tube 583 by having its anode connected over connected over point 581 to conductor 582 and by having its cathode connected to ground over the resistor 584, which is common to the two cathodes. The control grid for the tube 585 is connected to a tap of a one megohm potentiometer 586, which is connected between point 581 and ground. Conduction in the tube 585 can be controlled by the potential supplied to its control grid from the potentiometer, and this in turn will control the cathode potential of both tubes and determine the threshold for operating tube 583 from the circuit including the diodes.

When all the denomiations of the accumulator and counter stand at Zero, with the "0" tubes conducting, the cathodes of the diodes will be sufficiently positive that there will be no conduction across the diodes, and there will be no potential drop across resistor 580; consequently the potential of the control grid will be sufficiently positive that tube 583 will conduct and energize relay R6. However, as soon as an entry is made in any order of the accumulator or the counter, and the "0" tube in that order is extinguished, the cathode of that tube will become negative and will cause the cathode of the diode connected thereto to become sufficiently negative to cause conduction in the diode, with a consequent drop across resistor 580, sufficient to cause the grid of the tube 583 to become negative with respect to its cathode, thereby biasing tube 583 to cut-off and deenergizing the relay R6. The manner in which the relay R6 exerts its control will be explained more fully when the cooperation of the control relays is described.

It is to be noted that, by inserting the resistor 563 between the commutator segment and the conductor 562 for the "0" tube, the negative potential on the grid of the tube 554 will not be effective to prevent the proper control of the diode from the "0" tube, even though the sensing brush be standing on the "0" commutator segment.

The eight diodes 577 are included in four tubes mounted on a shelf 587, which extends from the front of the plate 531. Also mounted on the shelf 587 is the twin triode containing the eliminate relay operating tube 583 and its biasing tube 585.

Figure 3:
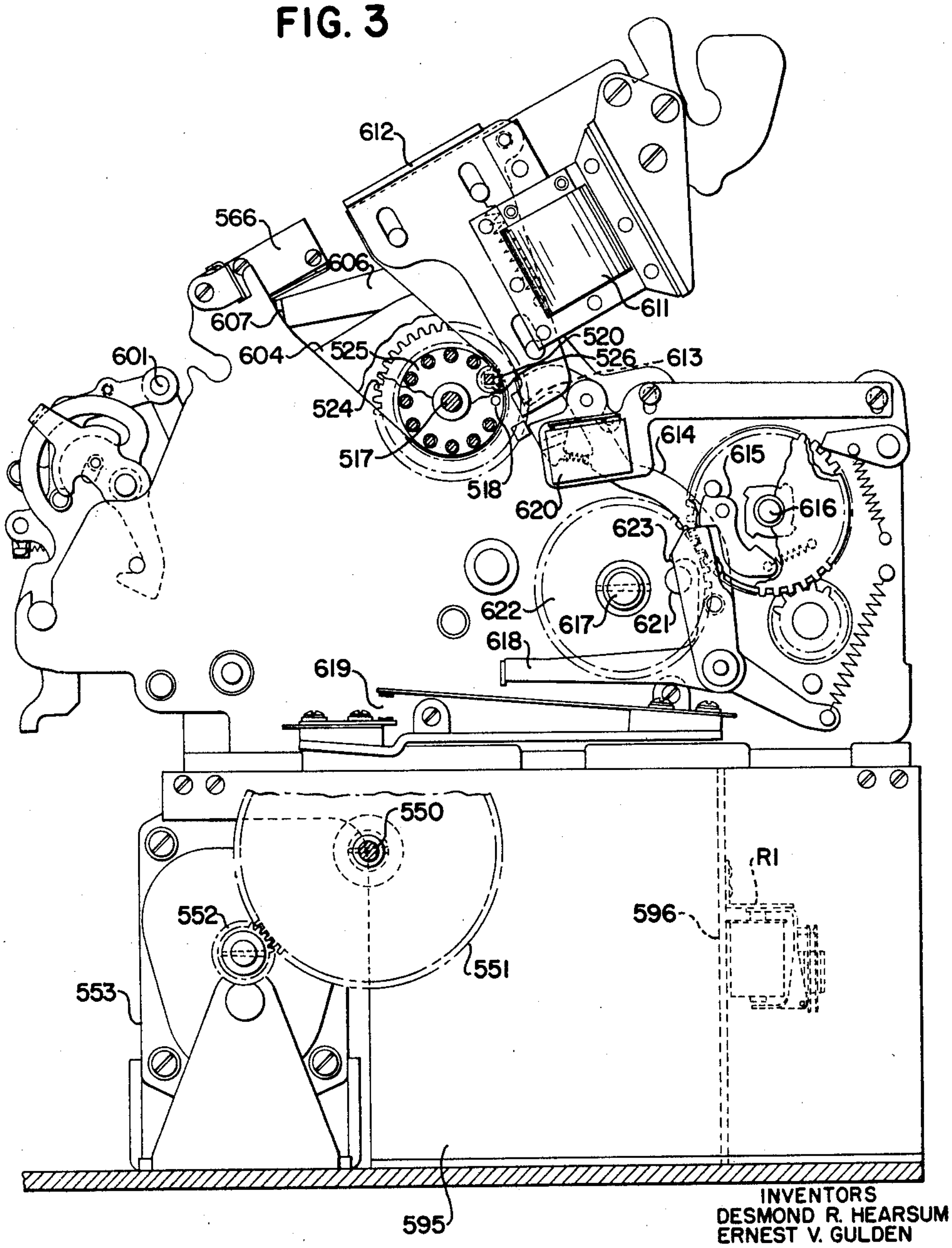
FIG. 3 is a section through the summary recorder, showing in particular the right side frame of the printing mechanism and details of the drive for operating the printing mechanism in a printing operation.
Figure 4:
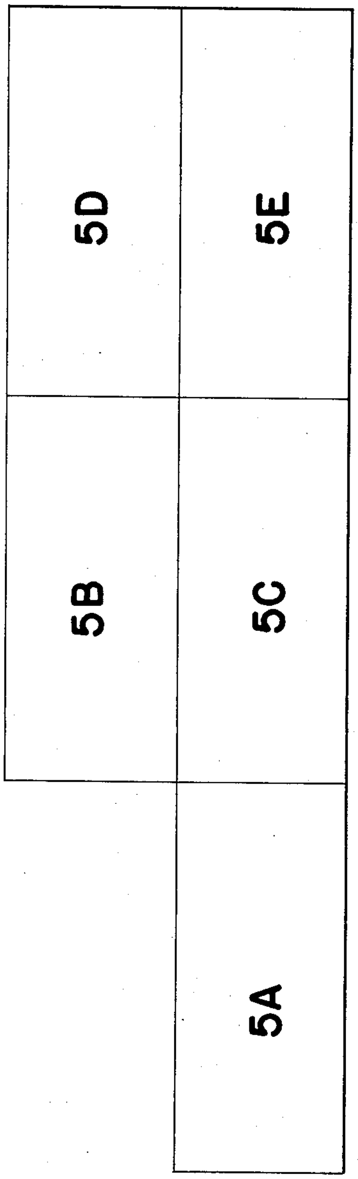
FIG. 4 is a diagram showing how FIGS. 5A to 5E inclusive are to be joined to form the circuit diagram.

The printer portion 37 of the summary recorder is shown particularly in FIGS. 1A and 3. This portion is supported above the base of the summary recorder by means of suitable supporting plates 595 (FIG. 3), the space beneath the printer portion being occupied by the motor 553 and by a panel 596, on which certain of the control relays, as R1, for example, are mounted.

Means are provided in the printer portion of the recorder to support a supply of record material 597 for movement to and from printing position and to line-space the record material each time it is moved to printing position. The paper-supporting framework consists of a pair of rockable end plates 598 and 599 (FIG. 1A) and a plurality of guide rods, as 600 and 601, which are effective to move the record material 597 from normal position, as shown in FIG. 1A, to printing position, closely adjacent the type wheels 515, each time the printer portion is operated.

Also carried by the rockable frame is a printing platen 602, which is rocked with the frame from the position shown in FIG. 1A to a position opposite the printing line. When opposite the printing line, the platen 602 can be operated to cause the data set on the type wheels to be printed.

The paper-supporting means and the platen and its operating means are fully shown in the Carey and Hearsum United States Patent No. 2,682,995, mentioned earlier herein, and reference may be had thereto for further details, if desired.

A pair of intermediate supporting plates 603 and 604 (FIG. 1A), which support the shaft on which the type wheels rotate, also support a pair of aliner-bar-supporting arms 606, mounted on a shaft 605, which support an aliner bar 607 for movement into engagement with the type wheels while an impression is being taken from the type wheels.

The switch 566 (FIG. 3), which is in the anode circuit of the clutch solenoid control and energizing tubes, is maintained in its closed position by the aliner bar 607 in its unoperated position, as shown in FIG. 3, but this switch will be opened as soon as the aliner bar moves to engage the type wheels in a printing operation.

The printer portion is driven by a motor 610 (FIG. 1A) to make impressions on the summary record. As soon as the read-out operation has been completed, control relays will be operated, in a manner to be explained fully when the control relays are described, and will energize a solenoid 611 (FIGS. 1A and 3) to pull down a printer trip member 612, which will move a lug 613 thereon below the upper curved end of a clutch release lever 614 to allow the clutch release lever to pivot counter-clockwise to release a clutch pawl 615 to couple the drive from the motor-driven shaft 616 to the main drive shaft 617. When the clutch release lever 614 is allowed to rock, its upper curved end will engage over the lug 613 on the trip member 612 to retain the trip member in its operated position.

The clutch release lever 614 has a forward arm 618, which, when the lever rocks counter-clockwise, closes contacts 619 in the circuit to the motor 610 to cause the motor to operate.

As soon as the trip member 612 has been operated far enough to release the clutch release lever 614, the lower edge of the trip member will close a switch 620, which will cause the solenoid 611 to be deenergized.

A stud 621 on a plate 622 on the main drive shaft 617 engages a restoring arm 623 on the clutch release lever near the end of a rotation of the main shaft 617 and rocks the clutch release lever clockwise to clutch-disengaging position, in which position its upper curved end is moved from over the lug 613 on the trip member and allows the trip member to return to blocking position.

The main drive shaft 617 (FIG. 1A) has thereon two clusters of cams, 624 and 625, for rocking the arms 606 to move the aliner bar into and out of engagement with the type wheels. Also mounted on the main drive shaft 617 is a cam 626, which operates an operating linkage 627 for rocking the record-material-supporting carriage to printing position, and a cam 628 for operating the link 629 to move the platen 602, which has been positioned opposite the type wheels to take an impression therefrom.

Accordingly, each time the trip hammer 612 is operated, it will initiate a printing operation in which the summary record will be line-spaced, and an impression will be taken from the type wheels which have been set during the read-out operation.

*Control Relays*

Certain control relays, in addition to the previously-described relay R6, perform functions in controlling the summary recorder in cooperation with the accumulator, and will be described herein. For a description of the functioning and relationship of other control relays of an apparatus in which the present invention may be embodied, reference may be had to the previously-cited parent application, Serial No. 349,297.

In order to identify the contacts which are related to and are operated by the several relays, they will be numbered with the number of the relay, followed by a letter indicating the type of contact—"*a*" for normally open, "*b*" for normally closed—and finally by a number indicating the particular contact of the relay. For example, contacts **R2*a*1 are contacts which are operated by relay R2, are normally open contacts, and are the No. 1 contacts associated with the relay; and contacts R2*b*2 are those which are operated by the relay R2**, are normally closed contacts, and are the No. 2 contacts associated with the relay.

Application of potential to the conductors 635 and 636 (FIG. 6) at the time that the apparatus is prepared for operation by moving an "on-off" switch to "on" position will cause relay R3 to be energized over the contacts **R2*b*2 and R4*b*2** to initiate a preliminary printing operation which prepares certain printer control relays for further automatic operation.

Relay R3 closes contacts **R3*a*1 to complete a circuit over contacts R2*b*2 to the solenoid 611**, which initiates an operation of the printer portion to take an impression from the type wheels.

Relay R3 also closes contacts **R3*a*2 in the circuit to relay R4 over contacts R2*b*2 and the switch 620, which is closed by the printer trip member 612** (FIG. 2) when the drive for the printer portion has been completely tripped.

Relay R4 will be energized when the switch 620 is closed and will close a holding circuit for itself over contacts **R2*b*2 and R4*a*1. It also opens contacts R4*b*2 in the circuit to relay R3, deenergizing relay R3, which in turn opens contacts R3*a*1 to deenergize the solenoid 611**.

This operation of the printing portion with the energization of relay R4 and deenergization of relay R3 prepares the printing portion control relays for further automatic operation.

When the summary recorder is to be set according to the code number and according to the amounts in the accumulator and the counter, the relay C5 (not shown) is energized as described in the previously-cited parent application, Serial No. 349,297, and contacts **C5*a*5, controlled by said relay, will close in the energizing circuit to the read-out and printing-operation-initiating relay R5** (FIG. 5D).

The contacts **C9*b*1 are effective to open the energizing circuit to the relay R5** to prevent any summary recording at the end of the pass.

It is to be noted that, if none of the code numbers on the tape being sensed correspond to the code number set in the apparatus, and no amounts were entered in the accumulator during the pass, then relay R6, which was energized when the accumulator was reset prior to the pass of the tape, will still be energized and will open contacts **R6*b*3 to prevent relay R5 from being energized, thereby eliminating an operation of the summary recorder, if no entries were made in the accumulator during the pass. If there has been an entry in the accumulator during the pass, then the closure of contacts C5*a*5 will complete the energizing circuit to relay R5**, which will immediately be energized to initiate the read-out cycle.

Contacts **R5*a*1 close and energize relay R2, which in turn closes contacts R2*a*1 in the circuit to the motor 553** (FIG. 3 and 6), which drives the indicator drums and the type wheels during a read-out operation.

The relay R2 also opens the contacts **R2*b*2 to deenergize the relay R4 and prepare the printing-operation-initiating circuit to relay R3 for operation as soon as the relay R2 is deenergized after the read-out operation. The relay R2 will be deenergized when the relay R5 is deenergized either by the opening of the contacts C5*a*5 upon the energization of the relay C5 (not shown) or by the opening of the contacts R6*b*3 upon the energization of the relay R6 when the accumulator has been reset to zero. When the contacts R2*b*2 reclose, the relay R3 and the solenoid 611 will be energized to initiate a printing operation and will, in turn, cause the relay R4** to be energized, as has been explained. The operation of the summary recorder to print the data which was set up during the read-out operation will take place during the next pass of the tape.

While the form of the invention shown and described herein is admirably adapted to fulfill the objects primarily stated, it is to be understood that it is not intended to confine the invention to the form or embodiment disclosed herein, for it is susceptible of embodiment in various other forms.

What is claimed is:

1. In a machine of the class described, the combination of a multi-denominational-order accumulator, each order of which may be set to any of the values of a notation, including zero; an amount-manifesting means; read-out means controlled by the accumulator and operable in a read-out operation to set the amount-manifesting means according to the amount in the accumulator; initiating means to set the read-out means in operation; and means controlled by the accumulator and operable when all denominations of the accumulator are in their zero condition for disabling the initiating means to prevent the operation of the read-out means to set the amount-manifesting means from the accumulator.

2. In a machine of the class described, the combination of a multi-denominational-order accumulator, each order of which may be set to any of the values of a notation, including zero; a recording means; read-out means controlled by the accumulator and operable in a read-out operation to set the recording means according to the amount in the accumulator; means operable after a read-out operation to operate the recording means to record the amount set therein; initiating means to initiate a read-out and recording operation of the recording means; and means controlled by the accumulator according to the amount therein and operable when all denominations of the accumulator are in zero condition for disabling the initiating means to prevent a read-out and recording operation while the accumulator remains in its zero condition.

3. In a device of the class described, the combination of an accumulator for accumulating amounts and indicating the total thereof; a conductor for each order of the accumulator and controlled thereby to have a distinctive potential applied thereto whenever its related order stands at zero; an amount-manifesting means; read-out means controlled by the accumulator for setting the manifesting means according to the amount in the accumulator; and disabling means coupled to the conductors for the several orders and operable when the distinctive potential has been applied to all the conductors, indicating that the accumulator is at zero, for disabling the read-out means to prevent the setting of the manifesting means.

4. In a device of the class described, the combination of an accumulator for accumulating amounts and indicating the total thereof; a conductor for each order of the accumulator and controlled thereby to have a distinctive potential applied thereto whenever its related order stands at zero; a recorder; read-out means controlled by the accumulator and operable in a read-out operation for setting the recorder according to the amount in the accumulator; means to operate the recorder to make a record of the amount set therein; means to initiate a read-out and recording operation; and disabling means coupled to the conductors for the several orders and operable when the distinctive potential has been applied to all the conductors, indicating that the accumulator is at zero, for disabling the read-out means to prevent the setting of the recorder and for preventing the initiating means from being effective to initiate a read-out and recording operation.

5. In a device of the class described, the combination of an accumulator for accumulating amounts and indicating the total thereof; a conductor for each order of the accumulator and controlled thereby to have a distinctive potential applied thereto whenever its related order stands at zero; an amount-manifesting means; read-out means controlled by the accumulator for setting the manifesting means accordig to the amount in the accumulator; and disabling means including a diode for each of the conductors for the several orders, which diodes are connected to their related conductors and have one mode of operation when the distinctive potential is applied to their respective conductors, indicating that the accumulator is at zero, and have another mode of operation as soon as an entry is made in the related order of the accumulator, and including means controlled jointly by all the diodes and effective when any diode is in said other mode of operation because of an entry in its related order of the accumulator, for disabling the read-out means to prevent the setting of the manifesting means.

6. In a device of the class described, the combination of an accumulator; a set of read-out conductors for each order of the accumulator, each set of conductors containing a conductor for each of the digits of a notation, including zero; means connecting each set of conductors to its related order of the accumulator which supplies a distinctive potential to that conductor of the set which corresponds to the digit set in that order; an amount-manifesting means; read-out means controlled by the distinctive potentials on the conductors and operable to set the manifesting means according to the amount in the accumulator; means to initiate an operation of the read-out means; and disabling means connected to the zero conductor of each set and operable when the distinctive potential is on all these conductors, indicating that the accumulator is at zero, for preventing an operation of the read-out means to set the manifesting means.

7. In a device of the class described, the combination of an accumulator; a set of read-out conductors for each order of the accumulator, each set of conductors containing a conductor for each of the digits of a notation, including zero; means connecting each set of conductors to its related order of the accumulator which supplies a distinctive potential to that conductor of the set which corresponds to the digit set in that order; a recording means; read-out means controlled by the distinctive potentials on the conductors and operable to set the recording means according to the amount in the accumulator; means operable automatically after a read-out operation to operate the recording means to record the amount set therein; means to initiate an operation of the read-out means; and disabling means connected to the zero conductor of each set and operable when the distinctive potential is on all these conductors, including that the accumulator is set to zero, for preventing an operation of the read-out means and the recording means.

8. In a device of the class described, the combination of a plurality of sets of conductors, one set for each order of an accumulator and each set of conductors containing a conductor for each of the digits of a notation, including zero; a multi-denominational-order accumulator to which the sets of conductors are connected, said accumulator having means in each order for supplying a distinctive potential to that conductor of the set which corresponds to the digit set in that order of the accumulator; an electron discharge device for each set of conductors, each device having means to control conduction therein; means connecting the discharge devices together to provide a common control according to the operation of the devices; means connecting the conduction control means of each device to the zero conductor of its set, the distinctive potential applied to the conductor, indicating that that order of the accumulator is at zero, causing a particular mode of operation of its related discharge device; and control means connected to the means which connects the discharge devices together, for control thereby to exert a desired control as long as the accumulator remains at zero and all the discharge devices are in said one mode of operation.

9. In a device of the class described, the combination of a plurality of sets of conductors, one set for each order of an accumulator and each set of conductors containing a conductor for each of the digits of a notation, including zero; a multi-denominational-order accumulator to which the sets of conductors are connected, said accumulator having means in each order for supplying a distinctive potential to that conductor of the set which corresponds to the digit set in that order; a recording means; read-out means controlled by the distinctive potentials on the conductors and operable to set the recording means according to the amount in the accumulator; means to initiate an operation of the read-out means and the recording means; and disabling means including a diode connected to the zero conductor of each set, each of which diodes has one mode of operation when the distinctive potential is on its related conductor, indicating that the order of the accumulator is at zero, and has another mode of operation whenever the distinctive potential is removed from the zero conductor, indicating that the order is set to a significant digit, and including means controlled by the diodes and operable when none of the diodes is in said other mode of operation, for preventing an operation of the read-out means and the recording means.

10. In a device of the class described, the combination of a plurality of sets of conductors, one set for each order of an accumulator, and each set of conductors containing a conductor for each of the digits of a notation, including zero; a multi-denominational-order accumulator to which the sets of conductors are connected, said accumulator having means in each order for supplying a distinctive potential to that conductor of the set which corresponds to the digit set in that order of the accumulator; a diode for each set of conductors; means connecting the anodes of the diodes together to provide a common control; means connecting the cathode of each diode to the zero conductor of its set, the distinctive potential applied to the conductor, indicating that that order of the accumulator is at zero, preventing conduction in the diode device; and control means connected to the means which connects the anodes together for control thereby to exert a desired control as long as the accumulator remains at zero and none of the diodes is conducting.

11. In a device of the class described, the combination of a plurality of sets of conductors, one set for each order of an accumulator, and each set of conductors containing a conductor for each of the digits of a notation, including zero; a multi-denominational-order accumulator to which the sets of conductors are connected, said accumulator having means in each order for supplying a distinctive potential to that conductor of the set which corresponds to the digit set in that order of the accumulator; a recording means; read-out means controlled by the distinctive potentials on said conductors and operable to set the recording means according to the amount on the accumulator; means operable automatically after a read-out operation to operate the recording means to record the amount set therein; means to initiate a read-out and recording operation of the read-out means and the recording means; an electron discharge device for each set of conductors, each device having means to control conduction therein; means connecting the discharge devices together to provide a common control; means connecting the conduction control means of each device to the zero conductor of its set, the distinctive potential applied to the conductor, indicating that that order of the accumulator is at zero, causing a particular mode of operation of its related discharge device; and disabling means connected to the means which connects the discharge devices together, for control thereby for preventing an operation of the read-out means and the recording means as long as the accumulator remains at zero and all the discharge devices are in said one mode of operation.

References Cited in the file of this patent

UNITED STATES PATENTS

| | | |
|---|---|---|
| 1,938,907 | Hosack | Dec. 12, 1933 |
| 2,412,537 | Roggenstein | Dec. 10, 1946 |
| 2,693,316 | Benson et al. | Nov. 2, 1954 |
| 2,864,554 | Rolph et al. | Dec. 16, 1958 |

UNITED STATES PATENT OFFICE
CERTIFICATE OF CORRECTION

Patent No. 3,047,226

July 31, 1962

Desmond R. Hearsum et al.

It is hereby certified that error appears in the above numbered patent requiring correction and that the said Letters Patent should read as corrected below.

Column 11, line 66, for "posiive" read -- positive --; column 13, line 41, strike out "over connected"; column 16, line 18, for "FIG." read -- FIGS. --; column 18, line 5, for "including" read -- indicating --.

Signed and sealed this 27th day of November 1962.

(SEAL)
Attest:

ESTON G. JOHNSON
XXXXXXXXXXXXXXXXXX
Attesting Officer

DAVID L. LADD
Commissioner of Patents